United States Patent [19]

Fecteau et al.

[11] Patent Number: 5,652,873
[45] Date of Patent: Jul. 29, 1997

[54] SYSTEM AND METHOD FOR SIMULATING A CONTIGUOUS ADDRESSABLE DATA SPACE

[75] Inventors: Jean Gilles Fecteau, Toronto; Eugene Kligerman; Lubor Kollar, both of North York, all of Canada

[73] Assignee: International Business Machines Corporation, Armonk, N.Y.

[21] Appl. No.: 443,371

[22] Filed: May 17, 1995

Related U.S. Application Data

[62] Division of Ser. No. 975,245, Nov. 12, 1992, abandoned.

[30] Foreign Application Priority Data

Dec. 11, 1991 [CA] Canada ................... 2055295

[51] Int. Cl.⁶ ..................... G06F 12/06; G06F 12/08
[52] U.S. Cl. ................. 395/500; 395/601; 395/670; 395/376; 364/225.2; 364/225.3; 364/255.1; 364/255.2; 364/255.7
[58] Field of Search ................... 395/425, 500, 395/775, 415, 375, 600, 650; 364/243, 228.3, DIG. 1, 228.2

[56] References Cited

U.S. PATENT DOCUMENTS

| | | | |
|---|---|---|---|
| 3,911,401 | 10/1975 | Lee | 340/172.5 |
| 4,136,385 | 1/1979 | Gannon et al. | 364/200 |
| 4,285,040 | 8/1981 | Carlson et al. | 395/400 |
| 4,481,573 | 11/1984 | Fukunaga et al. | 364/200 |
| 4,525,778 | 6/1985 | Cane | 364/200 |
| 4,577,274 | 3/1986 | Ho et al. | 364/200 |
| 4,686,620 | 8/1987 | Ng. | |
| 4,718,008 | 1/1988 | Chang et al. | 364/300 |
| 4,742,447 | 5/1988 | Duvall et al. | 364/200 |
| 4,758,946 | 7/1988 | Shar et al. | 364/200 |
| 4,819,156 | 4/1989 | DeLrme et al. | 364/200 |
| 4,843,541 | 6/1989 | Bean et al. | 364/200 |
| 4,843,542 | 6/1989 | Dashiell et al. | 364/200 |
| 4,961,134 | 10/1990 | Crus et al. | 395/200 |
| 5,008,811 | 4/1991 | Scalzi et al. | 364/200 |
| 5,021,946 | 6/1991 | Korty | 395/200 |
| 5,043,871 | 8/1991 | Nishigaki et al. | 364/200 |
| 5,058,003 | 10/1991 | White | 364/200 |
| 5,075,848 | 12/1991 | Lai et al. | 395/425 |
| 5,095,420 | 3/1992 | Eilert et al. | 395/400 |
| 5,125,086 | 6/1992 | Perazzoli, Jr. | 395/425 |
| 5,220,657 | 6/1993 | Bly et al. | 395/425 |
| 5,230,069 | 7/1993 | Brelsford et al. | 395/400 |
| 5,269,019 | 12/1993 | Peterson et al. | 395/600 |
| 5,317,731 | 5/1994 | Dias et al. | 395/600 |
| 5,353,430 | 10/1994 | Lautzenheiser | 395/444 |
| 5,388,196 | 2/1995 | Pajak et al. | 395/153 |
| 5,392,415 | 2/1995 | Badovinatz et al. | 395/425 |
| 5,410,700 | 4/1995 | Fecteau et al. | 395/700 |
| 5,473,777 | 12/1995 | Moeller et al. | 395/700 |

OTHER PUBLICATIONS

James L. Truley, "Advanced 80386 Programming Techniques," Osborne Mcgraw–Hill 1988.

*Primary Examiner*—Kevin J. Teska
*Assistant Examiner*—Thai Phan
*Attorney, Agent, or Firm*—Marilyn S. Dawkins, Esq.; Goldstein & Fox, P.L.L.C.

[57] ABSTRACT

Method and means are provided for simulating a contiguous data space within a computer memory, and for placing and accessing data objects of various sizes within the simulated contiguous data space. Multiple, sub-data spaces are concatenated in such a way that each page and each sub-data space in the contiguous data space are uniquely identified. Data objects are placed in the contiguous data space and at the first reference to a page of the data object, only the segment containing the referenced page in the contiguous data space is mapped to the database storage disk. Once a data space page is mapped, the operating system can read the page into memory without requesting a disk operation from the database manager. On modifying a page, if the database disk page location is changed, the contiguous data space page is remapped without changing the page address in the data space. Also, modified data pages are rewritten to the database storage disk in an ongoing manner set by the user, instead of at intervals set by the operating system.

4 Claims, 14 Drawing Sheets

FIG. 3
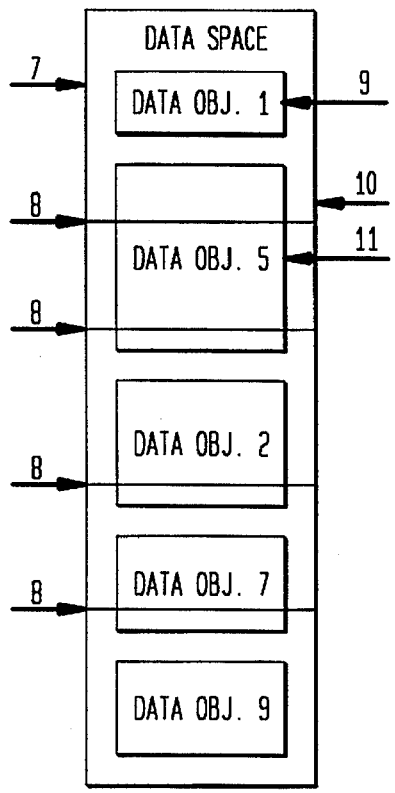
FIG. 4
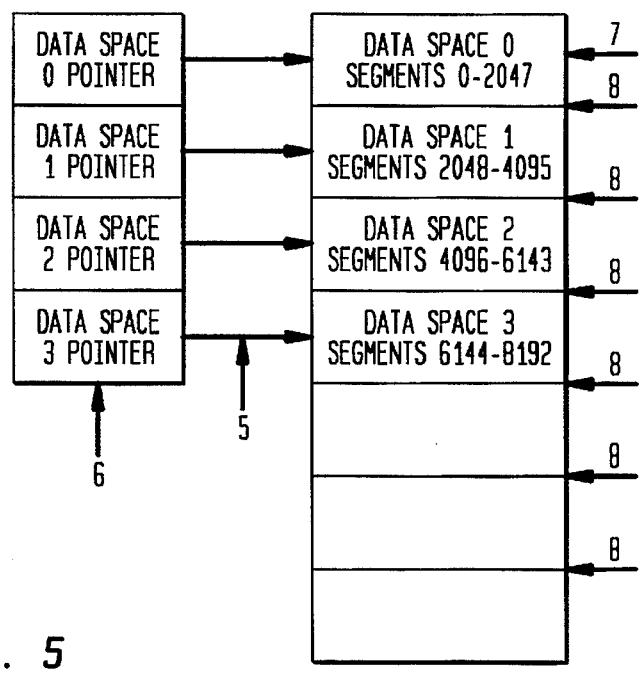
FIG. 5
| DATA SPACE NO. | PAGE NO. IN DATA SPACE |
|---|---|
| SEGMENT NUMBER | |
| 0000 \| 0000 \| 0000 \| 0000 \| 0000 \| 0000 \| 0000 \| 0000 | |

SYSTEM AND METHOD FOR SIMULATING A CONTIGUOUS ADDRESSABLE DATA SPACE

This application is a division of application Ser. No. 07/975,245, filed Nov. 12, 1992, now abandoned.

FIELD OF THE INVENTION

The invention relates in general to a method and means for mapping data objects from a simulated contiguous data space to the memory of a computer system.

BACKGROUND OF THE INVENTION

Computerized data processing systems rely on various types of storage spaces to process and store data. For example, "main storage" is program-addressable storage from which data can be loaded directly into the registers of the central processing unit (CPU) for processing. "Auxiliary storage" is addressable storage other than main storage that can be accessed by means of input/output (I/O) channels, and includes direct access storage devices such as magnetic storage disks. "Expanded storage" is a high-speed, high-volume electronic extension of main storage that is accessed synchronously in multiple-byte increments, e.g., 409 (4K) bytes, sometimes referred to as a "page".

Data on storage disks exists in sets of fixed length records accessible in pages. The size of a page varies depending on the system in use. On some systems a page is 4096 (4K) bytes. Also, on some computers, e.g., virtual machines, the operating system keeps track of disk space in blocks of 256 pages called segments. This is necessary because the hardware requires that a control block be maintained for each segment for virtual address translation. When data is to be transferred from auxiliary storage to the CPU, pages of data are transferred to a storage buffer in segments.

In order for the CPU to process the data, the data normally should be in main storage. Main storage however, is limited and is therefore not used to store large amounts of data permanently. On the other hand, vast amounts of data may be stored on data disks. However, accessing data from disks is slow compared to the rate at which it can be processed in main storage. To compensate for the difference in access rates, a data buffer is used. A data buffer is a portion of storage used to hold input and output data temporarily. The data buffer can reside in main storage or expanded storage.

On multi-user computing systems, concurrent users time-share the resources on the computer systems through "virtual machines". In a virtual machine, which is a functional simulation of the real machine, each user addresses the computer main storage as though it were real. Addressable main storage in a virtual machine is called "virtual storage". The size of virtual storage is limited by the addressing scheme of the computer system and by the amount of real disk storage available. Data in virtual storage is mapped to real addresses when the CPU references the data. Mapping is the establishment of correspondences between the physical storage and virtual storage locations. An address translation table is maintained by the operating system for this purpose.

On virtual machines, each user's reference to a memory address is referred to as a virtual address, and each range of addressable space available to a user is called an address space. When a user references a virtual storage location, the page containing that location may be on disk or expanded storage as indicated by a "flag" in the address translation table. When a page is to be copied to main storage, the operating system reads the page into an available real storage page location. When completed, the page translation table is updated to reflect the new page location. If no real storage space is available, the operating system frees up main storage space by "paging out" least recently used pages.

A typical database storage system comprises a directory disk, one or more data disks, and one or two log disks similar to the data disks. The directory disk contains information on the mapping of the database pages from virtual storage to their real physical location and other information describing the physical configuration of the data base. The data disks store data, while the log disks record transactions against the database.

In a database system, users are assigned logical pages on data disk to store data objects. A data object is a logical set of pages in the database. For example, in a relational database system, a data object may be viewed as a set of pages containing records of rows and columns of a table where each row is a separate record, and each column is a different data field. When a data object is created, entries are inserted in the database directory disk to indicate which data object pages contain data, and their physical location on a data disk. Initially, only directory space is taken, but as a user inserts data into a data object, pages are allocated on a data disk and the directory disk is updated to identify those pages.

In order to maintain data integrity, the database system has a mechanism to take "checkpoints" of the database at certain intervals to ensure that a consistent version of the database is saved. For example, when a database page is modified, a copy of the page as of the previous checkpoint is kept unchanged, the modified version of the page is copied to disk, and the page directory is updated to point to the new location. Hence, at checkpoint time, the modified version of the database becomes the current copy of the database.

On virtual machines, data space pages can be mapped to disk by various techniques. For example, contiguous virtual storage pages can be mapped to contiguous disk pages. This is referred to as a physical mapping. Alternatively, contiguous virtual pages can be mapped to non-contiguous disk pages. This is referred to as a logical mapping.

On some types of virtual machines, users access multiple address spaces. Some of these address spaces, however, contain only data (not computer instructions) and are referred to as data spaces. Furthermore, data space pages can be mapped to a data disk in such a manner as to eliminate the need for the database program manager to execute page I/O operations in order to move data between a data disk and main storage. On these systems, the location of a data object page on a data disk is known to the operating system. When the page is referenced by a user, it is read from its data disk location by the operating system without requiring a specific disk operation from the database program manager. When a page is directly accessible by the operating system, the database system operates more efficiently with less demands on CPU processing cycles.

On database systems, there is a continuing need to improve the overall efficiency of the system to handle large amounts of data. In particular, there is a need for faster responses to queries and data changes, efficient use of real storage, and improved efficiency in handling data objects. This, in turn, directs a need for database systems that optimize the use of data spaces, map only those pages of a data object that are referenced rather than the whole data object, and minimize database downtime at checkpoints.

In the prior art, various schemes are available to use data spaces. However, a method or means has not been found that discloses a multi-user system using data spaces in virtual memory for handling data objects of various sizes. Examples of prior art involving virtual memory but not addressing this deficiency, include: U.S. Pat. No. 4,742,447 ("Method To Control I/O Accesses In Multi-tasking Virtual Memory Virtual Machine Type Data Processing System") discloses a method for accessing information in a page segmented virtual memory data processing system in which virtual machines framing UNIX type operating systems are concurrently established, and in which a memory manager controls the transfer of information between primary storage and secondary storage devices in response to the occurrence of page faults.

U.S. Pat. No. 4,843,541 ("Logical Resource Partitioning of a Data Processing System") discloses a method and means for partitioning the resources in a data processing system into a plurality of logical partitions. The main storage, expanded storage, the channel and sub-channel resources of the system are assigned to the different logical partitions in the system to enable a plurality of preferred guest programming systems to run simultaneously in the different partitions.

U.S. Pat. No. 4,843,542 ("Virtual Memory Cache for Use in Multi Processing Systems") discloses a system for maintaining data consistency among distributed processors, each having an associated cache memory.

U.S. Pat. No. 4,922,415 ("Data Processing System for Converting Virtual to Real Addresses Without Requiring Instructions from the Central Processing") discloses a method in which a controller performs the translation functions for the inter-operability of the processor and memory and does so without requiring instructions from the processor.

U.S. Pat. No. 4,961,134 ("Method For Minimizing Locking and Reading in a Segmented Storage Space") discloses a page accessing method in a segmented table-space which eliminates unnecessary reading and locking. The table-space comprises data pages grouped into identical-sizes segments, each segment storing data for a single table. A status indicator for each data page of a segment is kept in a separate segment control block stored in a space map page.

Consequently, there is an unfulfilled need for a means to create and use data spaces to accommodate large data objects of different sizes, including data objects which may be much larger than the size of a single real data space.

Also there is an unfulfilled need for a means to make more efficient use of real storage by mapping to a data disk, only those data object pages from a data space that are referenced by the CPU, rather than mapping the entire data object.

Yet another unfulfilled need is a means to efficiently save modified pages from a data space to a data disk so as to reduce the database down-time at checkpoints.

A full understanding of how the present invention addresses the above unfulfilled needs may be had by referring to the following description and claims taken in conjunction with the accompanying drawings.

SUMMARY OF THE INVENTION

The present invention provides a method for simulating a contiguous addressable data space in a computer memory, which can be a virtual memory. Multiple addressable sub-data spaces are concatenated to simulate the contiguous addressable data space. The location of each concatenated sub-data space is kept track of within the contiguous addressable data space. Each sub-data space is identified by an assigned unique sub-data space identifier. Each sub-data space has a known number of pages and each page has a known number of addressable storage locations. Each page is assigned a unique page identifier within the contiguous addressable data space, and each addressable location within the contiguous addressable data space can be referenced based on its unique page identifier and sub-data space identifier containing the page.

Another aspect of the invention includes a means or apparatus for simulating a contiguous addressable data space in a computer memory. One embodiment uses computer programs stored or carried on suitable storage media, such as magnetic or optical media. The program includes means for concatenating multiple addressable sub-data space to simulate a contiguous addressable data space and means for keeping track of the location of each concatenated sub-data space within the contiguous addressable data space. An identification portion of the program provides means for identifying each sub-data space by an assigned unique sub-data space identifier. Each page has a unique page identifier so that each addressable location within the contiguous addressable data space can be referenced by the unique page identifier and sub-data space identifier containing the page.

Another aspect of the invention provides a computer system with a simulated contiguous addressable data space in computer memory. Multiple addressable sub-data spaces simulating the contiguous addressable data space are concatenated using an index containing the location of the sub-data spaces. Each sub-data space is identified by a unique sub-data space identifier and has a predefined number of pages, wherein each page has a predefined number of addressable storage locations. The addressable storage locations are mappable to corresponding locations in another storage device. Each page is identified by a unique page identifier within the contiguous addressable data space and each addressable location within the contiguous addressable data space is capable of being referenced by means of a unique page identifier and the sub-data space identifier.

BRIEF DESCRIPTION OF THE FIGURES

FIG. 3 shows how multiple independent sub-data spaces are made to appear contiguous by using a table of pointers;

FIG. 4 shows data objects placed in specific data spaces using logical mapping;

FIG. 5 shows how a page address can be converted to a data space address and the relevant portion of the address used by this invention;

DETAILED DESCRIPTION OF THE PREFERRED EMBODIMENTS

Figure 1:
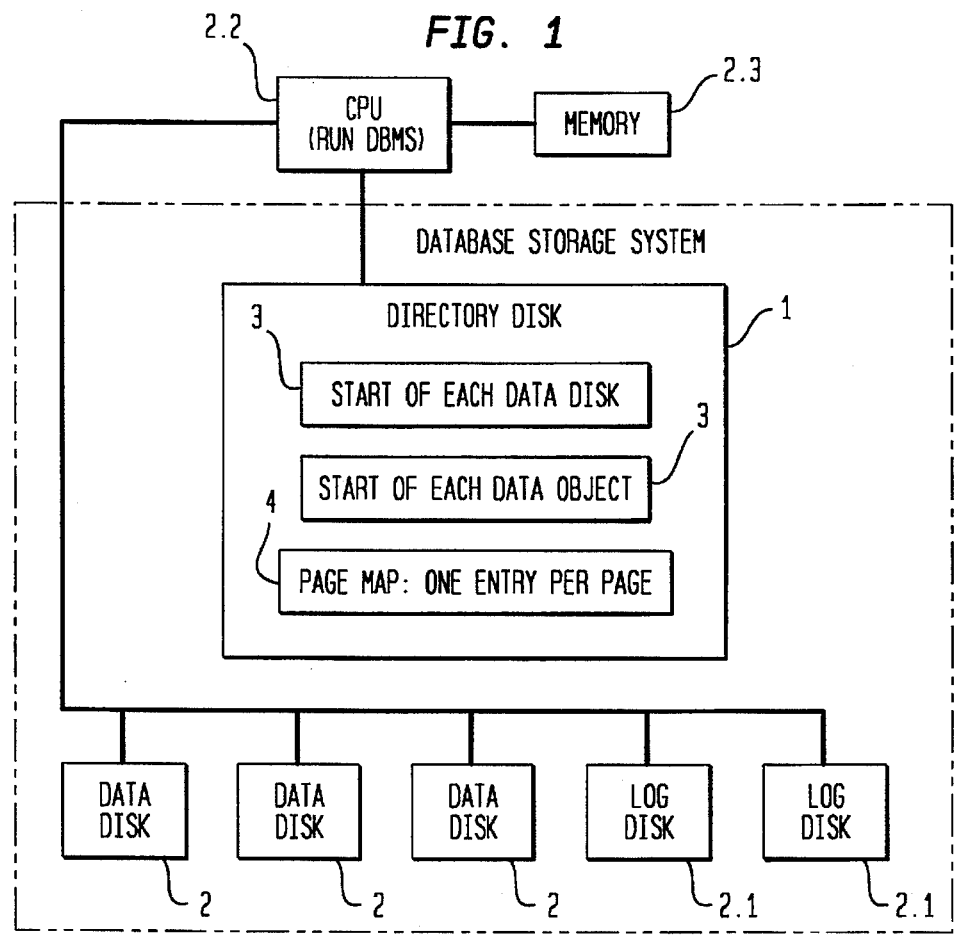
FIG. 1 shows key information maintained in a database directory relevant to the present invention.

The invention is implemented using the database storage system shown in FIG. 1. It comprises a directory disk 1, one or more data disks 2, and one or two log disks 2.1 similar to the data disks. The database storage system is part of a computer system having a central processing unit (CPU) 2.2 and memory 2.3. The CPU runs a database management system (DBMS) software program which manages the data stored in the storage devices 2.

The directory disk 1 contains information on the mapping of the database pages from virtual storage to their real physical locations and other information describing the physical configuration of the database. The data disks 2 store data, while the log disks 2.1 record transactions against the database.

In a database system, users are assigned logical pages on a data disk 2 to store data objects. A data object is a logical set of pages in the database. For example, in a relational database system, a data object may be viewed as a set of pages containing records of rows and columns of a table where each row is a separate record, and each column is a different data field. As shown in FIG. 1, when a data object is created, entries are inserted in the database directory to indicate which data object pages contain data 3, and their physical location on a data disk 4.

Figure 2:
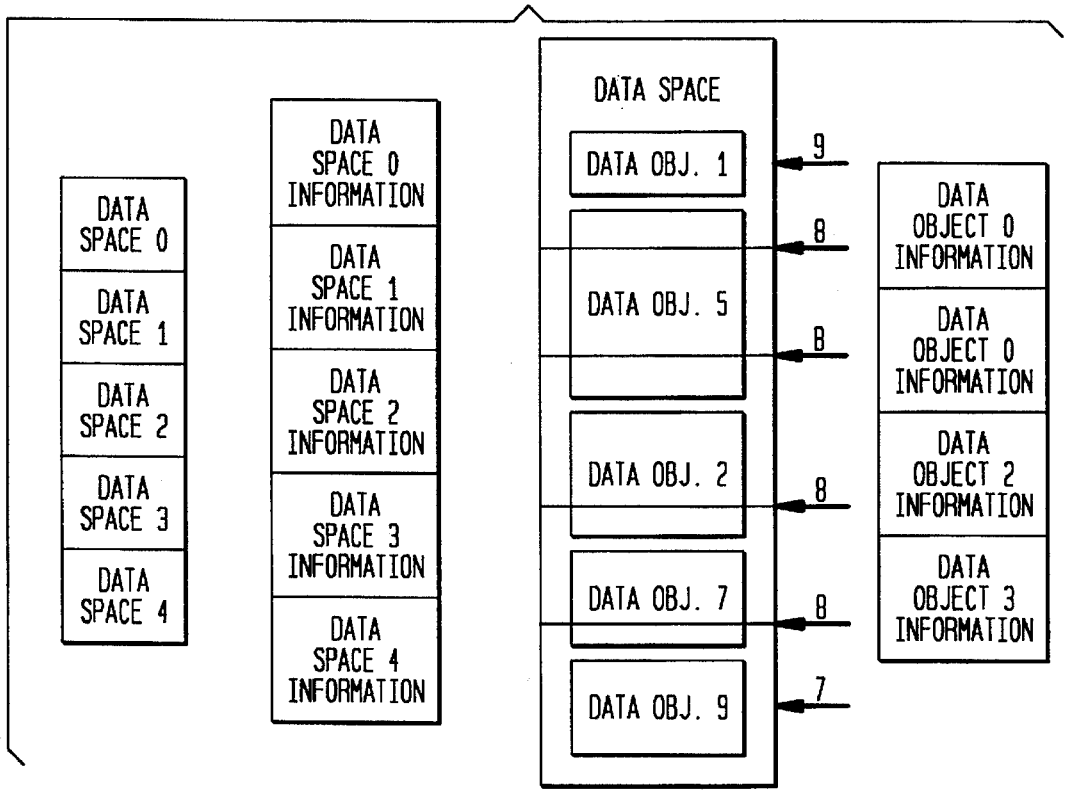
FIG. 2 shows an overall representation of the key elements in this invention.

The present invention incorporates the chosen embodiment of FIG. 2 into a database system as shown in FIG. 1. Therefore, the present invention is a database system that supports data objects and data space services. However it is to be understood that the invention is not restricted to the specific system described, but can be applied on a computer system that supports data spaces, data objects and data disks in the manner described herein.

Figure 6:
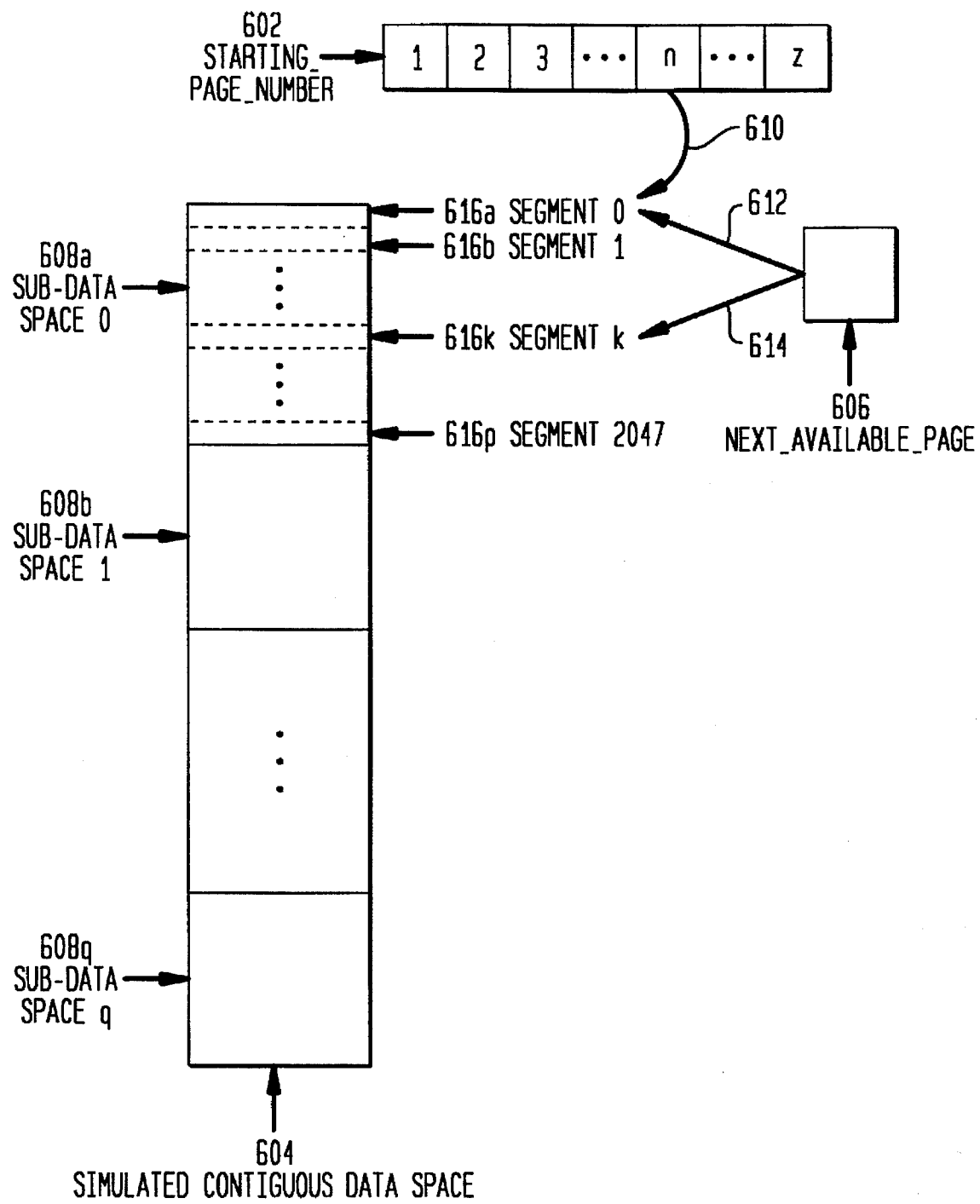
FIG. 6 is a block diagram illustrating the structure of a simulated contiguous data space.

The invention is summarized as comprising the following steps which are described in more detail in subsequent sections:

Step 1. As shown in FIGS. 4 and 6, on database initialization, the present invention provides for the creation, by the use of pointers 5 and a data space table 6, of a contiguous data space 7, 604 comprising linked, but separately identifiable, sub-data spaces 8, 608a–608q. Each data page within the contiguous area 604 is identifiable by an assigned page number. Each sub-data space 608a–608q within the contiguous data space area is identifiable by an assigned sub-data space identifier;

Step 2. On first reference to a data object in the database by a user, the invention reserves enough pages in the simulated contiguous data space 604 to place the entire data object starting from the first available "empty" page location. In the simulated contiguous data space, the pages to be reserved start from the first available free page, and the page number is incremented sequentially to match the size of the data object. The invention provides means to identify any page of the data object within the simulated contiguous data space 604 once the starting page number 602 of the data object is established and its size, expressed in pages, is known;

Step 3. On first reference by a user to a page in the data object within the contiguous area 604, the invention provides for a mapping to disk only the segment 616a–616p of the data object containing the desired page. This partial mapping of the data object, rather than mapping the whole data object, minimizes the use of main storage because for each segment mapped, the operating system has to maintain a control block which uses up real storage. Delaying the mapping to a segment on the first reference means that a control block is only allocated if the segment 616a–616p is actually referenced. Therefore, data space segments 616a–616p that are never referenced, and thus not mapped, will not require a control block;

Step 4. After pages have been modified, the invention saves the modified pages at predetermined time intervals set by the user, rather than waiting for the database system to make a global save at a checkpoint. This provision of the invention allows pages to be saved in an ongoing manner that minimizes the database down time associated with a system initiated checkpoint.

Details on the above steps are provide in the following sections.

Since a data object can be larger than the maximum size of the real data space available to a user, the first step, as provided by this invention and shown in FIG. 3, is to create a large simulated contiguous data space 7, 604 by linking separately identifiable fixed-sized sub-data spaces 8, 608a–608q. This may done advantageously by the following steps:

i) Logically link multiple fixed-sized sub-data spaces 608a–608q using an array of pointers, and maintain a data space table for this purpose. See FIG. 3;

ii) For each page in the simulated contiguous data space 604, assign a unique page number as provided for by this invention; and iii) For each page in the simulated contiguous data space 604, establish the page number as provided for by the present invention.

In order to keep track of the identity of each data object and sub-data space 608a–608q within the simulated contiguous data space 604, a table of pointers is set up to identify the start and end of each data object and sub-data space 608a–608q. Within the simulated contiguous data space 604, any page number can be located as provided by the present invention. For example, if the size of each sub-data space 608a–608q is 524,288 pages, and the page being referenced is page number 1,217,436, then the referenced page is 168,860 in the third sub-data space 608a–608q. After the page has been identified, it can be mapped to the correct real storage page.

In pseudocode format the procedure to determine the page address as a function of its location on a data space 608a–608q is expressed as shown in Table 1.

In the pseudocode in Table 1, the Starting_page_number is the location of the first page of the data object in the simulated contiguous data space. The symbol (/) represent an integer division. The symbol (//) represents the remainder of an integer division. The symbol (*) is the multiplication operator. The variable (n) is the identity of the data object. The variable (m) is the page number within the data object containing the required data.

Figure 7:
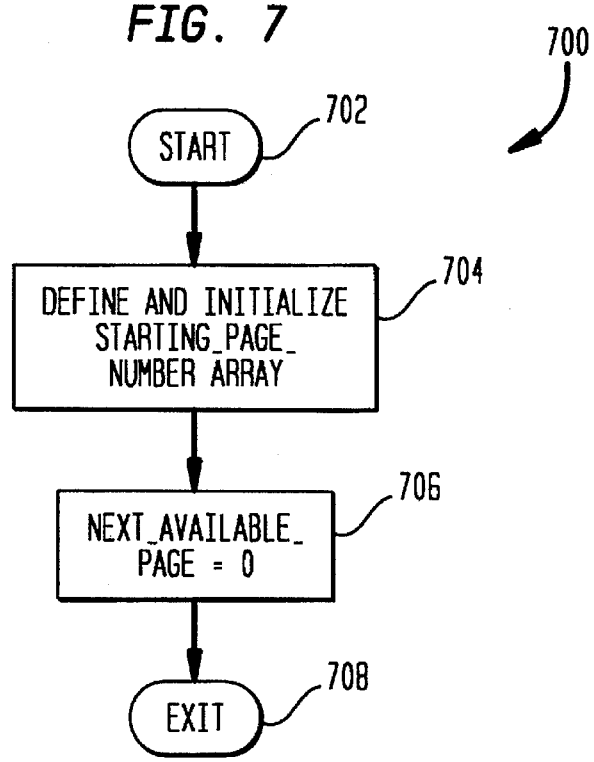
FIG. 7 is a control flow diagram illustrating the present invention at system initialization.
Figure 8:
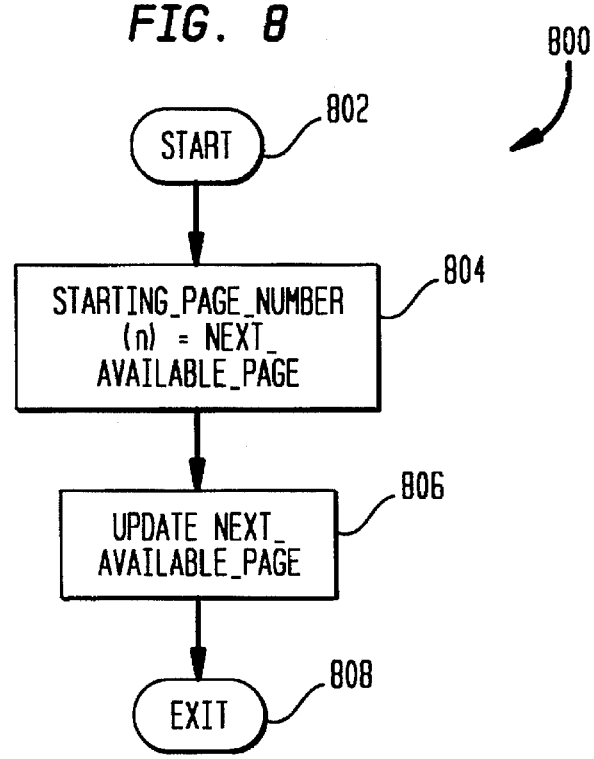
FIG. 8 is a control flow diagram illustrating how a data object is added to a simulated contiguous data space.
Figure 9:
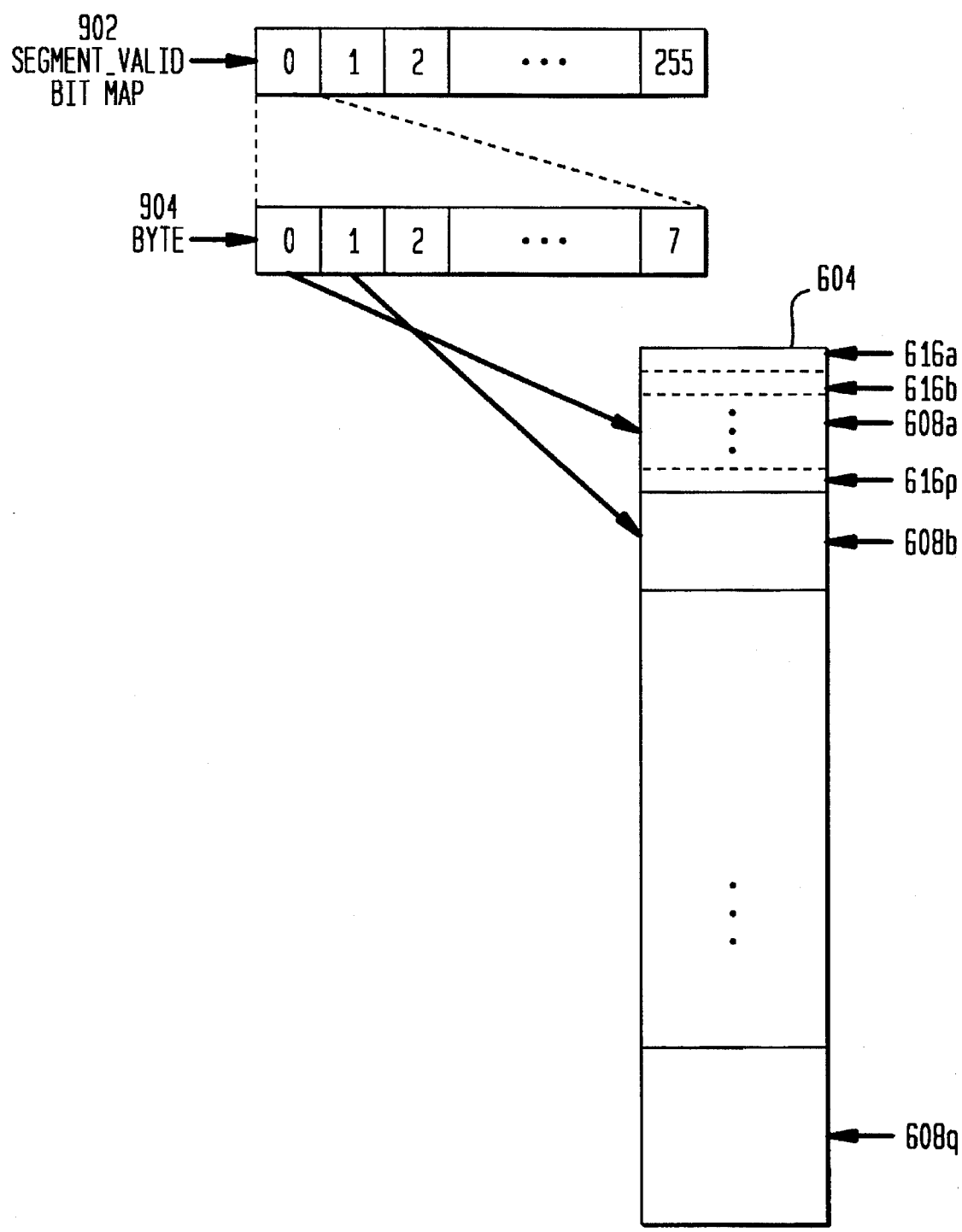
FIG. 9 is a block diagram illustrating the structure of a segment_valid bid map.

If the data object Starting_page_number is not known, it is determined as follows:

i) On database initialization, an array named "Starting_page_number" 602 is defined to contain the starting page location of each data object to be placed in the simulated contiguous data space 604. The dimension of the array 602 is the same as the number of data objects in the database. The array 602 is initialized to negative values to indicate that the data objects have not yet been placed in the simulated contiguous data space 602. See step 704 in FIG. 7;

ii) A variable "Next_available_page" 606 is defined and initialized to 0 to indicate that this is the beginning page of the empty simulated contiguous data space 604. See step 706 in FIG. 7;

iii) At the first user reference to a data object, the next available set of pages in the simulated contiguous data space 604 is reserved for the referenced data object. The Starting_page_number 602 of the referenced data object 610 to the Next_available_page 606 counter. See step 804 in FIG. 8; and iv) The Next_available_page 606 counter is then increased by the size of the data object (in pages) rounded up to the next segment 616a–616p so as to start all data objects on a segment boundary 612, 614. See step 806 in FIG. 8. In this invention, it is convenient to start the data object on a new page segment boundary, but this is not an essential requirement if the systems does not handle pages in segments.

With the above procedure, any address within the simulated contiguous data space 604 can be determined once the location of the object is known. Segments 616a–616p of the data object can then be mapped to its disk 2 using information in the database directory 1.

The same result can be obtained by shifting bits. For example, on a 32-bit computer architecture, bits 0 to 12 can be used to represent the data space number, and bits 13 to 31 shifted left 12 positions (equivalent to multiplication by 4096) as the address in the data space. This alternative procedure is illustrated in FIG. 5.

Once the simulated contiguous data space 604 is created, a data object can be placed in the data space as shown in FIG. 3. For example, data object number 1 (9) consisting of 102,528 pages is placed in pages 0 to 102,527 in sub-data space 1 (10). This may be followed by another data object number 5 (11), say, consisting of 1,024,000 pages placed from pages 102,656 (which marks the beginning of a new segment in data space 1) to pages spanning sub-data spaces 2 (8) and 3 (8). In this example, data object 1 would therefore be placed in the first 400 segments of the simulated contiguous data space, while data object 5 would be placed from the first page of segment number 401 starting from page number 102,565.

Similarly, since the Starting_page_number 602 for each data object is known, any request for a data page can be converted to a page number within the simulated contiguous data space 604. For example, if data object (n) starts at page 1,126,656 and we request data page 90,780 of data object (n), we can calculate the page number to be 1,217,436 or page 168,860 located in the third sub-data space 608a–608q.

An important benefit in allowing a data object to start on a segment 616a–616p boundary instead of at the beginning of data space 608a–608q is the ease in supporting both very large data objects (spanning more than one data space 608a–608q) and very small data objects (spanning much less than the size of one data space 608a–608q). This invention eliminates the need to have one contiguous data space 604 for each data object, and makes it possible to have many small and large data objects placed in the same simulated contiguous data space 604.

Once the data object has been placed in the simulated contiguous data space, it can be mapped to the correct data disk 2 pages based on information contained in the database directory disk 1. However, mapping an entire data object at its first reference is expensive and requires considerable real storage. For this reason, this invention provides a mechanism to delay the mapping until a first reference of a data object, and then to map only a segment 616a–616p consisting of the desired pages of the data object by a procedure called "mapping on demand."

Mapping on demand is illustrated in FIGS. 9–12 and can be explained as follows: For each sub-data space 608a–608q, a bit map 902 is created to indicate if each segment 616a–616p in the sub-data space 608a is currently "referenced". A segment 616a–616p is referenced if the pages containing data in that segment 616a–616p have been mapped to disk 2. Initially, the bit map 902 is set to '0' and the entire sub-data space 608a–608q is considered not referenced. The bit is referred to as the "segment valid bit" and one bit map 902 is used per data space 608a–608q. For example, if a sub-data space 608a–608q is made up of 524,288 pages and each segment 616a–616p is 256 pages, then there are 2048 segments 616a–616p. Therefore, the bit map 902 is 2048/8=256 bytes per sub-data space 608a–608q which is allocated when the sub-data space is created 608a–608q.

Figure 10:
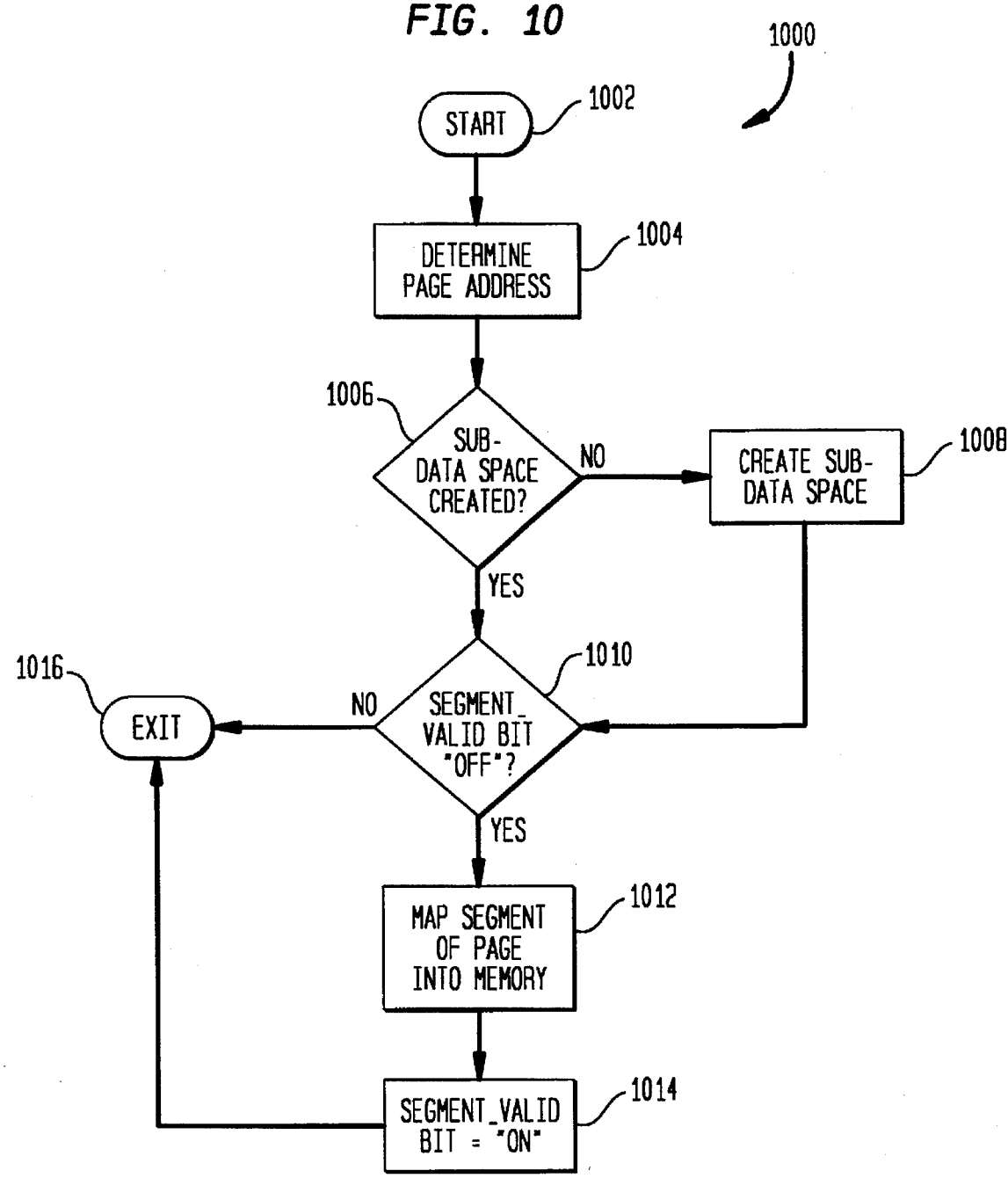
FIG. 10 is a control flow diagram illustrating mapping on demand.
Figure 11:
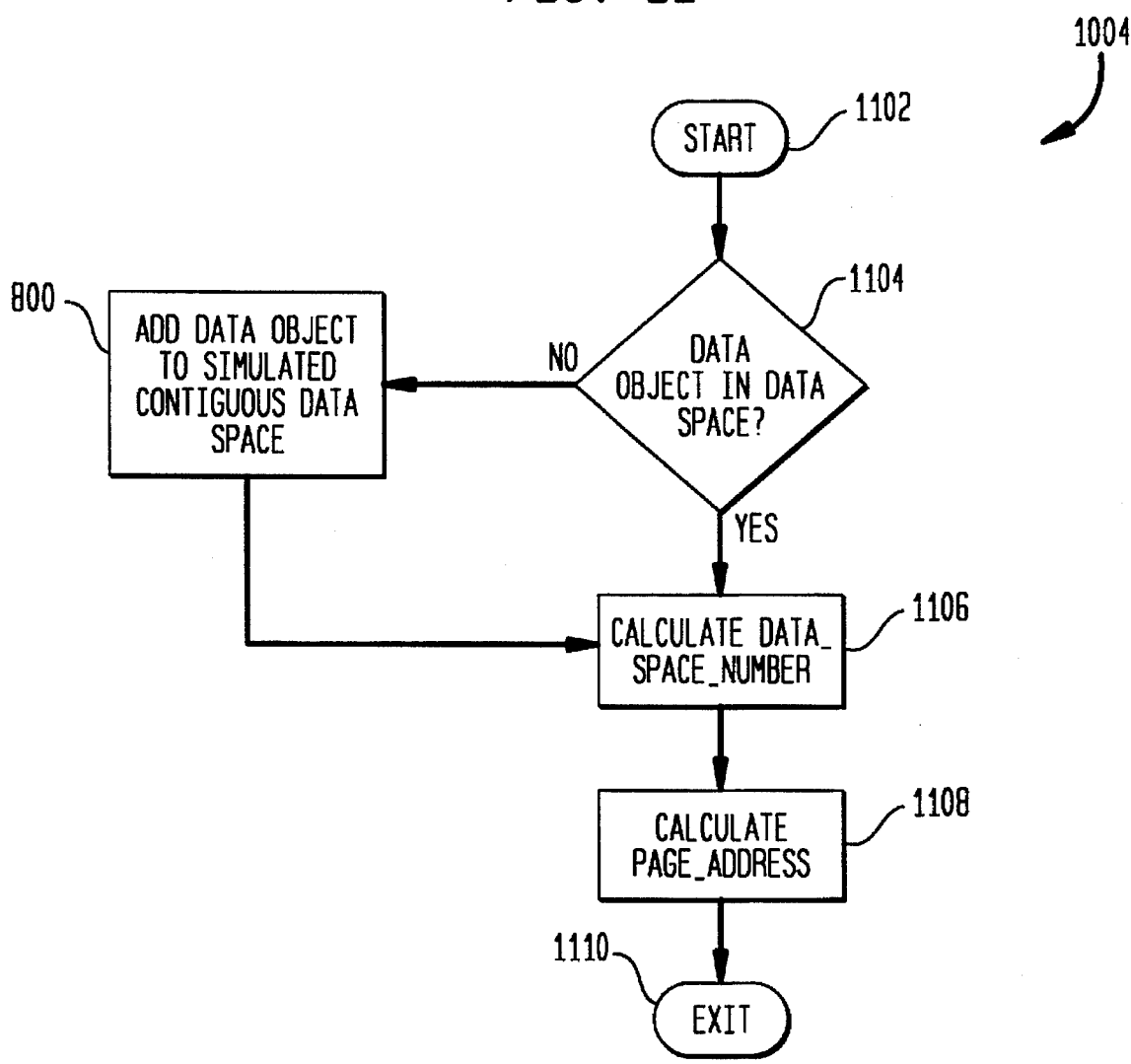
FIG. 11 is a control flow diagram illustrating how to calculate a page address in a simulated contiguous data space.
Figure 12:
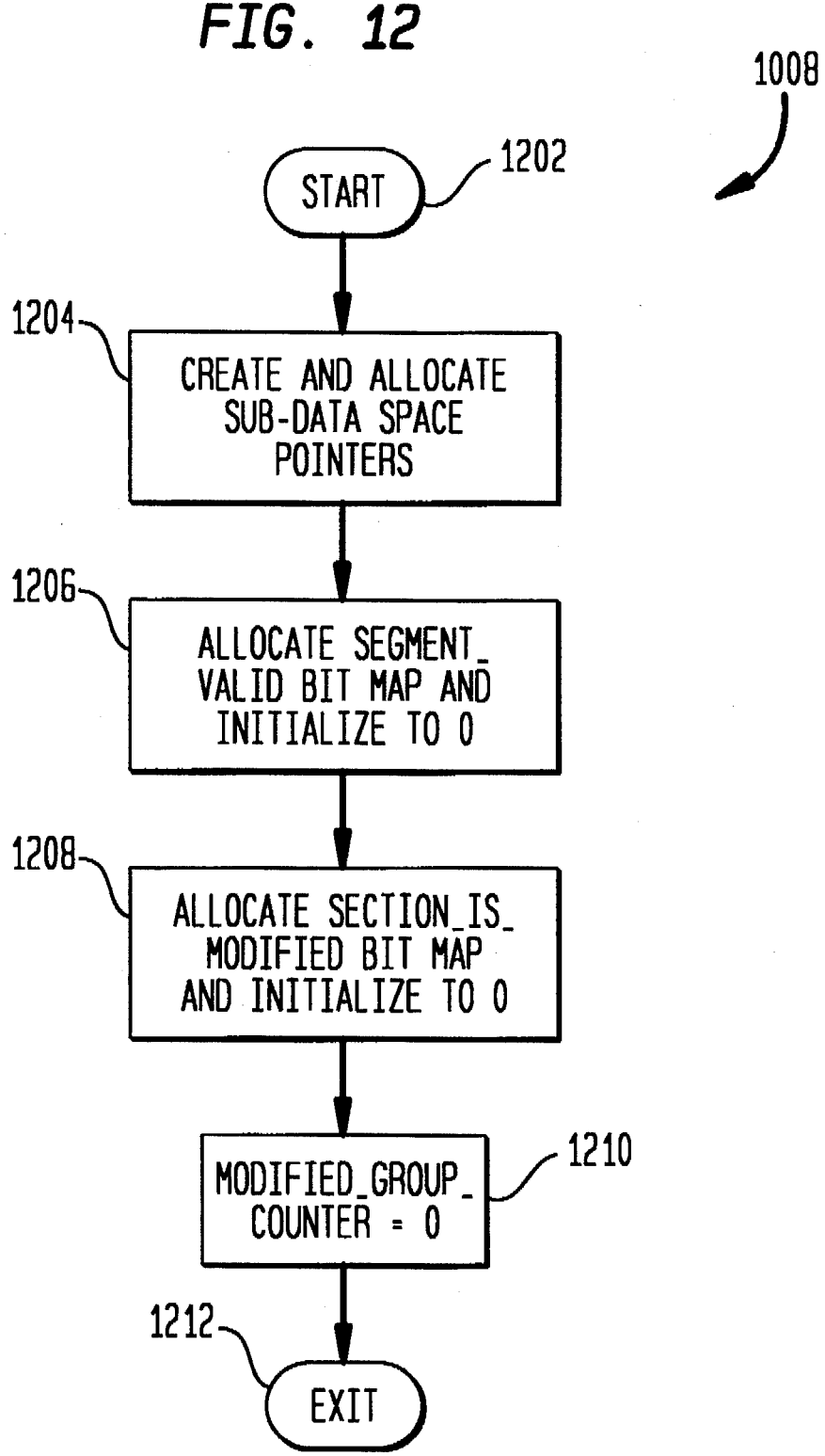
FIG. 12 is a control flow diagram illustrating the creation of a sub-data space in a simulated contiguous data space.

Although the entire data object is placed in the simulated contiguous data space 604 when it is first referenced, the sub-data spaces 608a–608q and the bit maps 902 may not all exist. The mechanism provided by this invention to calculate the page address of any page in the contiguous data space 604 detects if this is the first reference to a sub-data space 608a–608q and/or a segment 616a–616p of the data object. If this is the first reference, a sub-data space 608a–608q is created and a segment 616a–616p is mapped. The steps comprising mapping on demand are illustrated in FIG. 10 and are summarized as follows:

Step 1. At first reference to a data object, place it in the simulated contiguous data space by allocating the starting and ending data space 604 address as previously described. See step 1004 in FIG. 10, steps 1104 and 800 in FIG. 11, and FIG. 8;

Step 2. Calculate the address of the referenced page as previously described. See steps 1106 and 1108 in FIG. 11, thereby returning to step 1006 in FIG. 10;

Step 3. If the sub-data space 608a–608q was not created as determined in step 1006, then proceed to step 1008 which is illustrated in FIG. 12. Proceeding to step 1204, the database manager creates the sub-data space 608a–608q as previously described and sets the data space identifier value used to address that sub-data space 608a–608q. Continuing to step 1206, the database manager allocates and initializes the segment validity bit map 902. Processing continues to steps 1208 and 1210 which are described in detail below. Processing then returns from step 1008 and continues to step 1010; and Step 4. Proceeding from step 1008 to step 1010, if the segment 616a–616p containing the page is not mapped, then proceed to step 1012. In step 1012 map the segment 616a–616p and continue to step 1014 to turn on the bit to indicate that the segment 616a–616p was mapped.

This procedure is summarized in the pseudocode shown in Table 2.

In the pseudocode in Table 2, Starting_page_number 602 is an array of as many elements as the number of data objects in the database. The symbol (/) represent the division function. The symbol (//) represent the remainder of a division. The symbol (*) represent the multiplication operator. The symbol (z) is the number of pages in a segment. The symbol (y) is the size of a page in bytes. The symbol (m) is the referenced page from the start of the data object. The symbol (n) is the identity of the data object. The symbol (x) is the number of pages in one data space.

Checking the "segment valid" bit at each page request is inexpensive because the bit map 902 is small. If the segment 616a–616p is not mapped, then the database manager program reads the directory 1 blocks containing information on the pages required for that segment 616a–616p and issues a request to map the segment 616a–616p that contains the referenced pages to page locations on disk 2. Once mapped, the "segment valid bit" is turned on and any subsequent reference to read a page in that segment 616a–616p is translated directly to a virtual storage address without reference to the database directory 1. The net result is an improved query response time.

Figure 13:
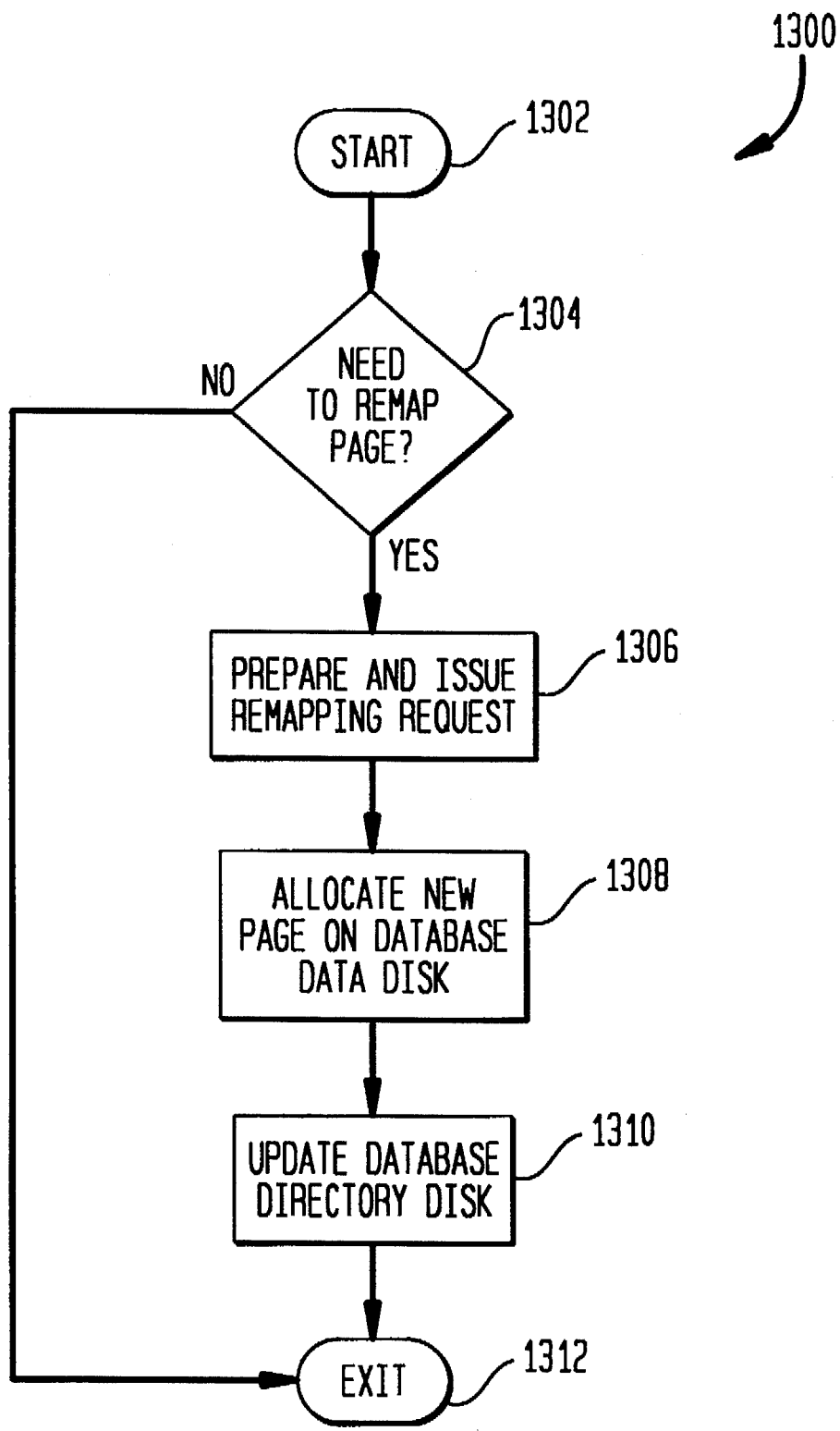
FIG. 13 is a control flow diagram illustrating the remapping of a data page.

If a request is made for an update (the page was modified), the page may have to be shadowed (moved to a new disk location). Alternatively it may have to be inserted if it had not existed before (i.e., first insert). This requires a change to the mapping in which case the database manager determines from the database directory if the page needs to be (re)mapped. Remapping a page is illustrated in FIG. 13. Beginning at step 1304, the database manager determines whether a page needs to be remapped. If so, the database manager continues to step 1306 to prepare and issue a remapping request. Continuing to step 1308, a new data page is allocated. Continuing to step 1310, the directory 1 is updated and a new mapping is done. This results in a mapping change, not a change in the virtual address of a page.

Figure 14:
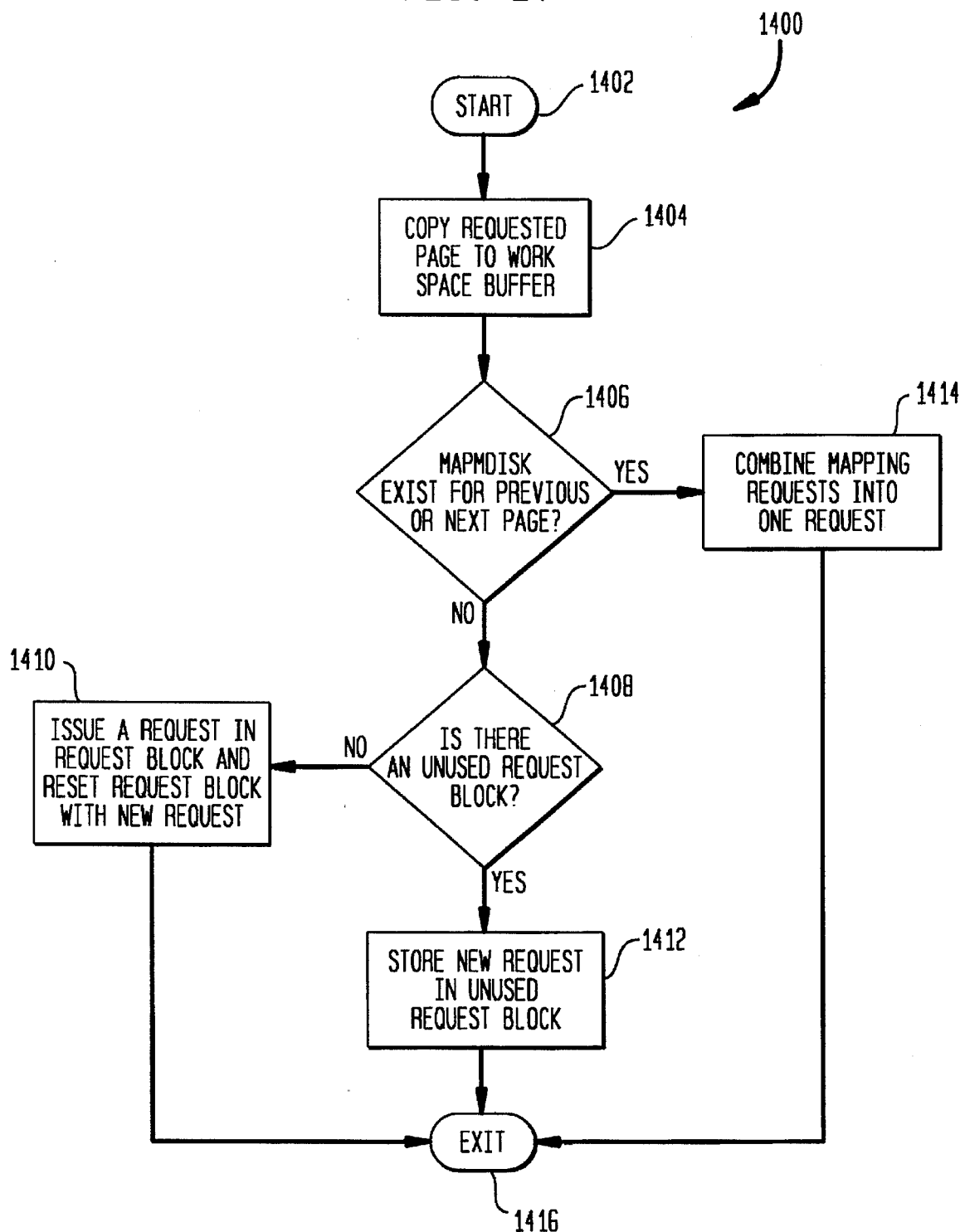
FIG. 14 is a control flow diagram illustrating the modification of a data page and the remapping of the data page using MAPMDISK.

An example of mapping on demand, as provided by one aspect of the present invention, is illustrated in FIG. 14 and can be described using the IBM SQL/DS database management system operating on an IBM System/390 computer with the IBM VM/ESA operating system. Before updating a page, the IBM SQL/DS management system begins at step 1404 and copies the requested page to a buffer. It then reissues the MAPMDISK DEFINE request with the PAGEVIEW=ZERO parameter before copying the data back from the local buffer to the data space 608a–608q. Note, PAGEVIEW=ZERO informs VM/ESA operating system that it should provide an empty real storage page for that data space page 608a–608q rather than reading the contents of the disk 2 when the page is first referenced.

If updating without the use of a local buffer is desired, the page can be remapped with the PAGEVIEW=RETAIN parameter. This first reads the copy of the page from its current disk 2 (old) location before resetting the mapping to the new location. Consequently, the user is presented with the old copy of the page which will be written to the new location.

When the local buffer is used, the remapping can be deferred to when the page is moved back from the local buffer to the data space 608a–608q. Performance optimization is implemented by delaying the remapping in an attempt to group multiple mapping requests into one MAPMDISK DEFINE call.

For this purpose, several MAPMDISK DEFINE request blocks can be initialized and used as required. Each request can be batched for several consecutive data space pages.

When a page is moved to the local buffer, step 1404, and a MAPMDISK DEFINE is required, the following is done for a new request:

i) Continuing from step 1404 to step 1406, the IBM SQL/DS management system determines if a MAPMDISK DEFINE request exists for the previous or the next page of the same data space 608a–608q. If one exists, processing continues to step 1414 in which the two requests are combined into one;

ii) If the new request cannot be attached to any existing request so that it would be consecutive, processing continues to step 1408. In step 1408, if an unused request block exists, processing proceeds to step 1412 in which the unused request block is used, use it to store the new request; and iii) If step 1408 determines that all of the pre-allocated request areas are in use, processing continues to step 1410 in which the IBM management system issues the DEFINE for the requests already in one of the request control blocks and resets the block for the current page.

Since, by using an embodiment of the present invention, the operating system is now responsible for performing the database I/O operations through its paging mechanism, an interface is used to ensure that all modified data is written to the database at regular intervals, thereby maintaining integrity of the database.

In the prior art, mechanisms exist to request that changes to a database be written to disk 2 while the database manager is waiting. However, such mechanisms may cause significant delays at a checkpoint time because many pages may be needed to be written to disk 2. To resolve this problem, some operating systems have implemented a mechanism whereby the database manager can specify a subset of the database to be made current on disk 2 (i.e. to be written to disk 2 if the pages in memory were modified). Further, the mechanism is said to be asynchronous in that a save request can be issued, and processing continued, while the I/O operations are performed. An indicator is presented to the database manager when all I/O operations needed for that save have completed.

One embodiment of the present invention takes advantage of the above mechanism to implement a partial save. Like mapping on demand which allows the database manager to delay the mapping to the first reference of a page, the invention provides for a partial save which allows the database manager to request page saves at short intervals and for only the modified pages of a data object.

Figure 15:
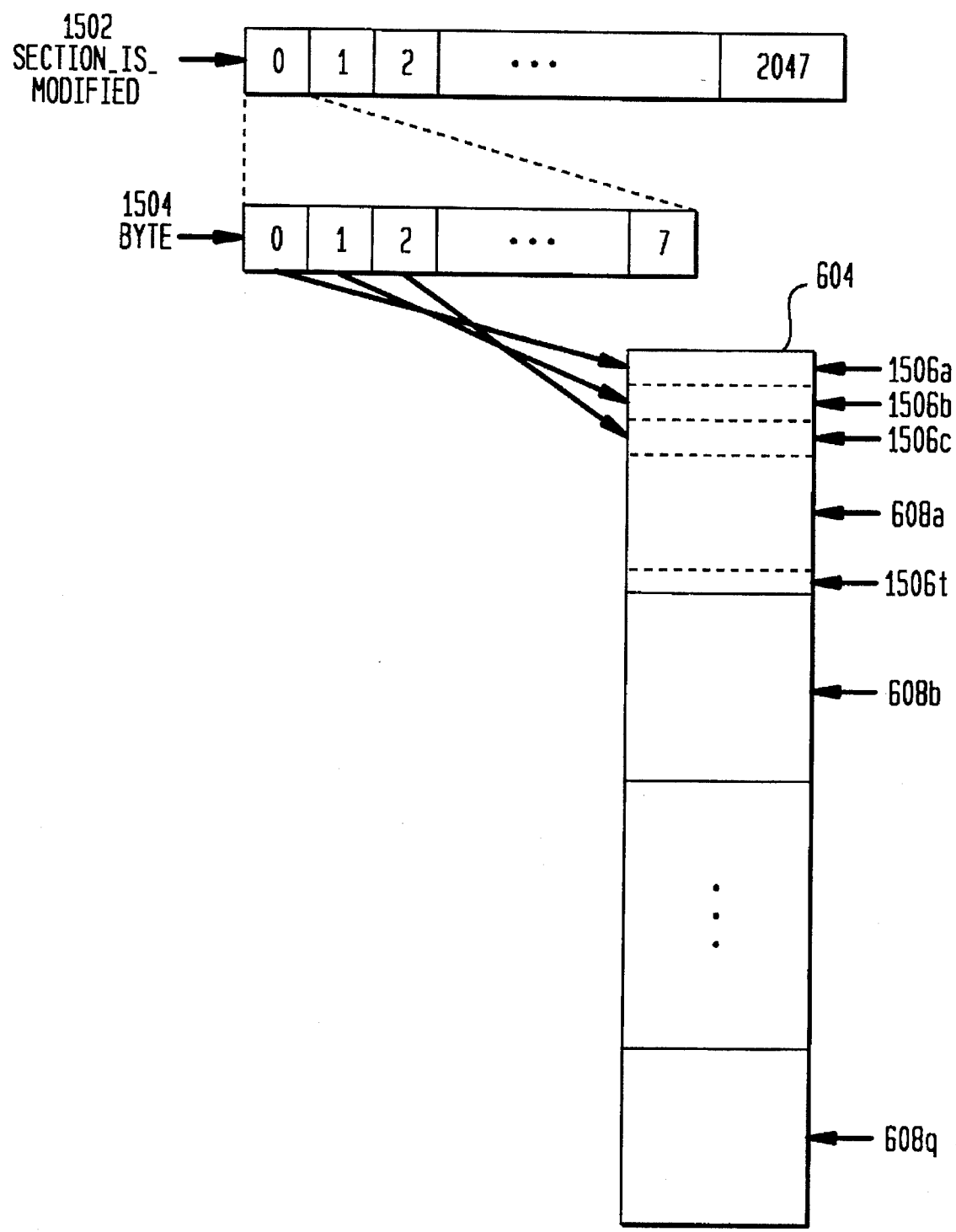
FIG. 15 is a block diagram illustrating the structure of a section_is_modified bit map.
Figure 16:
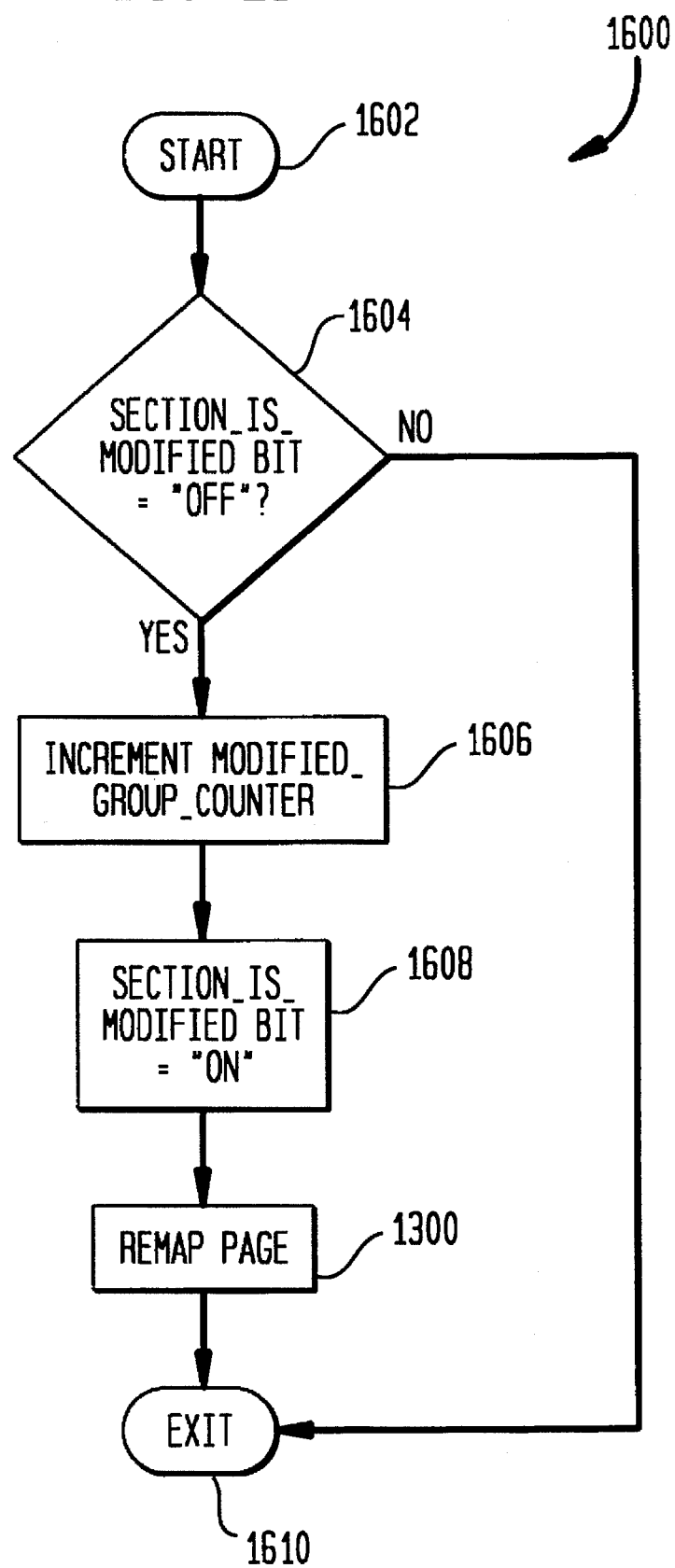
FIG. 16 is a control flow diagram illustrating the modification of a data space.
Figure 17:
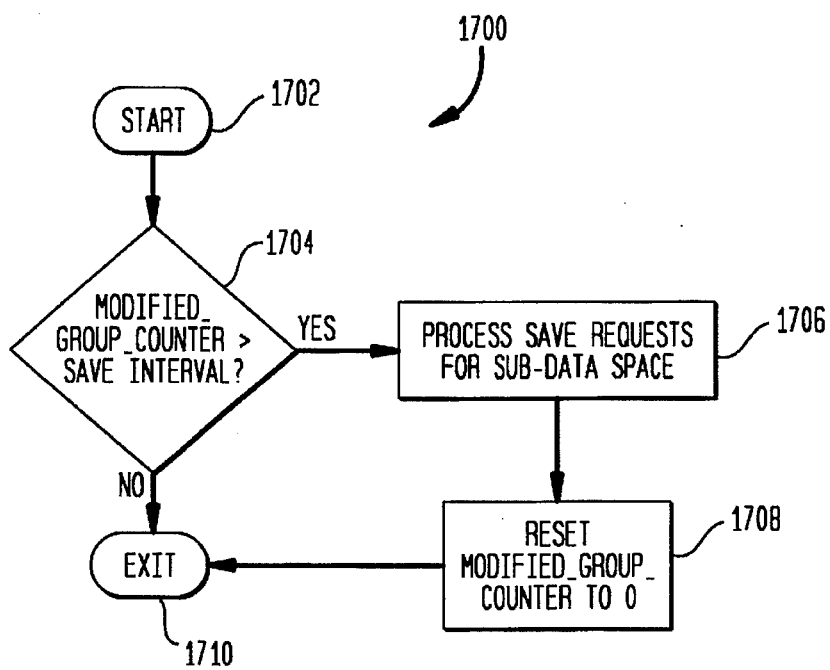
FIG. 17 is a control flow diagram illustrating the saving of modified pages in a simulated contiguous data space at a save interval.

Partial save is illustrated in FIGS. 15–17 and can be described using the IBM SQL/DS database management system as follows:

Like the Segment Valid Bit map 902, a bit map 1502 is allocated and set to '0' when a data space 608 is referenced for the first time. See step 1208 in FIG. 12. In this case the bit map 1502 comprises 1 bit for every 32 pages (or 2048 bytes per data space 608a–608q) which is referred to as a 'MODIFIED BIT MAP' 1502. The bit representing a set of 32 pages is calculated by dividing the page address by 131,072 (32 pages of 4 096 bytes each). Before moving a page from the local buffer back to the data space 608a–608q, the corresponding bit in the 'MODIFIED BIT MAP' 1502 is checked. See step 1604 in FIG. 16. If processing proceeds to steps 1606 and 1608 in which the bit is OFF (0), it is then turned ON (1) and a counter is incremented to keep track of the number of bits currently ON.

In step 1704, when the counter reaches a predefined limit (set by the user) the data base manager proceeds to step 1706 and issues a MAPMDISK SAVE using as the list of addresses to save, the list corresponding to the pages represented by the ON bits in the 'MODIFIED BIT MAP' 1502.

Step 1706 is described in more detail below. The database manager then continues to step 1708 and resets the bit map to OFF (0). Since the request is asynchronous, the database manager continues processing while the I/O operations take place. The value of the counter determines the frequency with which the partial saves are issued (a lower counter causes more frequent partial saves). The counter also determines the maximum number of outstanding page sets for which the SAVE has been issued to save all the database pages on disk 2.

Figure 18:
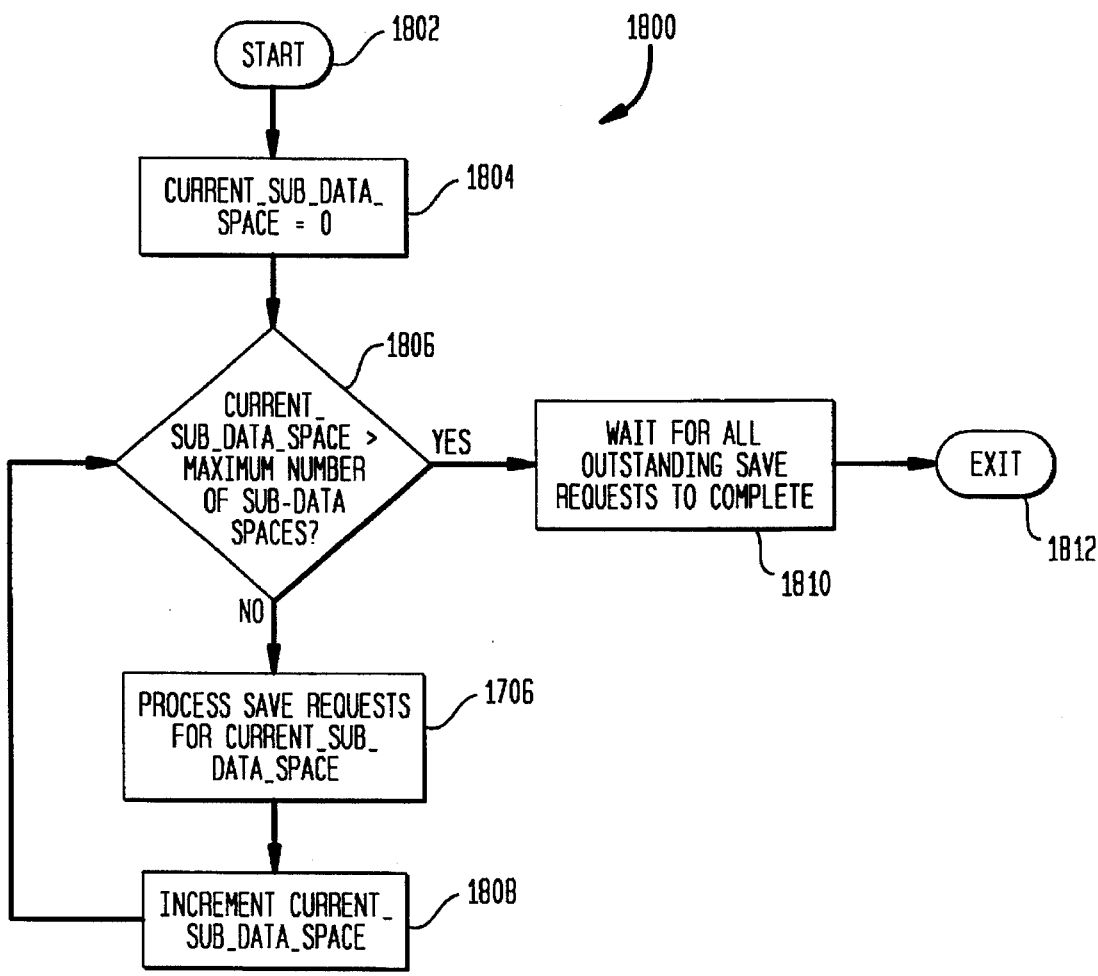
FIG. 18 is a control flow diagram illustrating the saving of modified pages in a simulated contiguous data space at a checkpoint.
Figure 19:
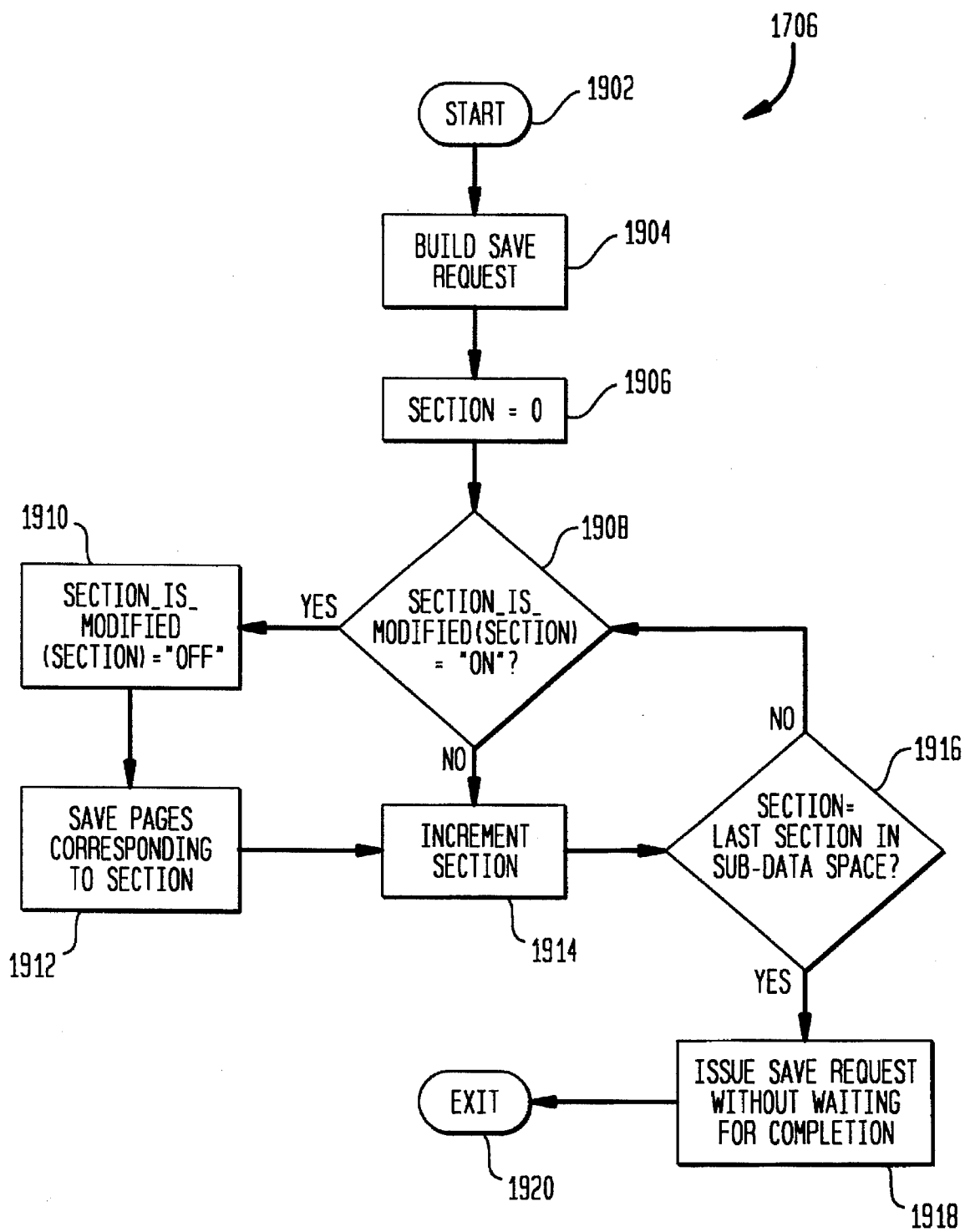
FIG. 19 is a control flow diagram illustrating the process for saving write requests for a sub-data space.

The steps comprising the partial save are summarized as follows:

Step 1. When a data space is created, allocate a bit map 1502 made of 1 bit per 'n' pages of data spaces 608a–608q and initialize the bit map 1502 to '0'. See step 1208 in FIG. 12. Initialize a counter (Modified_group_count) for that data space 608a–608q to 0. See step 1210 in FIG. 12;

Step 2. When modifying a page in the data space 608a–608q, execute step 1604 to check the corresponding bit in the bit map 1502. If the bit is OFF (0), continue to step 1606 and increment the Modified_group_count for that data space. Continuing to step 1608, change the bit to ON (1);

Step 3. Executing step 1704 as illustrated in FIG. 17, if the Modified_group_count reaches a save interval threshold proceed to step 1706. In step 1706, as illustrated in FIG. 19, execute steps 1904–1916 to build a save request comprising all of the pages corresponding to the ON (1) bits in the bit map 1502 for that data space 608a–608q. Continuing in FIG. 19, in step 1910, reset the bit map to OFF (0), and in step 1918, issue the SAVE request as an asynchronous request; and Step 4. At a checkpoint time, illustrated in FIG. 18, build a save request, step 1706, for each data space 608a–608q of the pages corresponding to the ON (1) bits in the bit map 1502 of the data space 608a–608q. See steps 1804–1808 in FIG. 18. In step 1706, as illustrated in FIG. 19, reset the bit map 1502 to OFF (0), step 1910, and issue the save request, step 1918. Referring again to FIG. 18, continue to step 1810 and wait for all the request to complete before marking the checkpoint as completed.

The data space 608a–608q creation procedure of the present invention is represented in pseudocode as shown in Table 3.

In the pseudocode in Table 3, (*) is the multiplication operator. The symbol (x) is the number of pages in one data space. The symbol (y) is the number of bytes per page. The symbol (m) is the size in pages of the data object. The symbol (n) is the number of pages represented by 1 bit. The symbol (i) is a counter.

For each SAVE request issued, the database manager keeps the control which was built to issue the request until the request completes. On completion, if the operating system indicates that some of the I/O operations were not completed, due to a hardware problem, the database manager takes corrective action.

No restrictions are placed on pages that are referenced in a MAPMDISK SAVE request. Therefore, the pages can be modified after the request is issued even before the SAVE completion is received. No assumptions is made on what version of the page was written out. The system saves the latest copy at a later time.

With this invention, the database manager I/O function is bypassed. Furthermore, a page I/O operation is implemented so that the operating system informs the database manager that a paging I/O operation is needed (and informs it when it is completed), thereby allowing the database manager to perform other tasks in parallel with the I/O operation. This technique has been proven to result in very significant improvements in database response times without compromising data integrity.

If the Starting_page_number of the data object (n), is greater or equal to 0 (i.e., the data object was placed in the simulated contiguous data space, then do;

Data_space_number=[(Starting_page_number of data object, (n))+m]/[the size of 1 data space expressed in pages]

Similarly the page address within the sub-data space of the data object can be determined as follows:

TABLE 1

Page address = [(Starting_page_number of data object, (n)) + m]// [(The size of 1 data space expressed in pages) * (the size of 1 page expressed in bytes))

end;

TABLE 2

```
If Starting_page_number for data object (n) is not assigned then do;
        Starting_page_number (n) = Next_available_page;
        Reserved_space = ((Data_object_size (n) / (z) + 1) * (z);
        Next_available_page = Next_available_page + Reserved_space;
end;
do;
        Data_space_number = (Starting_page_number (n) + m)/x;
        Page_address = ((Starting_page_number (n) + m) // x) * y;
        end;
IfData_space_pointer (Data_space_number) was not created
then
do;
        Create the data space
        Set Data_space_pointer (Data_space_number) to the value
                used to address that data space.
        Allocate the segment valid bit map for that data space
                and initialize it to off.
end;
If Segment_valid (Page_address / y*z) is off then
do;
        Map the segment containing Page-m
        Set segment_valid (Page_address / y*z) on;
end;
```

TABLE 3

```
If Data_space_pointer (Data_space_number) = 0 (this data
            space does not already exist) then
do;
    Create the data space
    Set Data_space_pointer (Date_space_number) to the sub-data space
            pointer value used to address that data space.
    Allocate the segment valid bit map for that data
            space and initialize it to off.
    Allocate the section_is_modified bit map for that
            data space of size (m/n) and
            initialize it to off.
    Set Modified_group_count (Data_space_number) to 0.
end;
        Similarly the page modification procedure can be represented in
pseudocode as shown as follows:
        Modify the page.
If Modified_group_count (Data_space_number) >
Save_interval
        and Section_is_modified (page-address / (n*y) is off then
            do;
                Initialize a save request
                Do i = 0 to (x/n) − 1
                    If section_is_modified (i) is on then
                        Add pages from (i*n) to ((i*n)+n) to the save request
                    end;
                Reset Section_is_modified to off
                Issue the save request without wait for completion
            end;
        If Section_is_modified (page_address (n*y) is off then
            do; /* none of the pages in this section were modified */
            Increment modified_group_count (Data_space_number) by 1.
                Set Section_is_modified (page_address / (n*y) on.
        End;
        Similarly the checkpoint procedure can be represented in pseudocode as
shown as follows:
Do j = 1 to max (Data_space_number)
    Initialize a save request
        Do i = 0 to (x/n) − 1
            If section_is_modified (i) for data space (j) is on
                Add pages from (i*n) to ((i*n)+n) to the save request
            End;
        Reset Section_is_modified for data space (j) to off
        Issue the save request without wait for completion
        End;
    End;
    Wait for all outstanding save requests to complete.
```

While the invention has been particularly shown and described with reference to a preferred embodiment thereof, it will be understood by those skilled in the art that various other changes in the form and details may be made therein without departing from the spirit and scope of the invention. For example, the various tables mentioned herein may actually be structured as described or may be split into multiple tables to provide for normality of data. Accordingly, the method and system herein disclosed are to be considered merely as illustrative and the invention is to be limited only as specified in the claims.

What is claimed is:

1. A method for a database management system to simulate a database in a contiguous data space in computer memory, wherein the database comprises one or more data objects of variable size and is stored in one or more database storage disks, comprising:

(1) creating the contiguous data space by allocating and initializing a data space to sub-data space mapping table having a plurality of table entries, wherein each table entry includes a sub-data space identifier, wherein the contiguous data space is a concatenation of a plurality of sub-data spaces, each sub-data space being assigned a sub-data space identifier, wherein the contiguous data space and said sub-data spaces are addressable by the database management system with said sub-data space identifiers, and wherein the computer memory comprises a virtual memory and said sub-data spaces comprise virtual data spaces;

(2) allocating and initializing a starting page number identifier to record a starting page number in the contiguous data space for each data object in the database, wherein said starting page number indicates a page number at which a data object is placed in the contiguous data space;

(3) allocating and initializing a next available page identifier to record a page number indicating a beginning of an empty page in the contiguous data space;

(4) determining whether a data object has been added to the contiguous data space, when said data object is referenced;

(5) setting said starting page number identifier for said data object equal to said next available page identifier if it is determined in step (4) that said data object has not been added to the contiguous data space; and (6) incrementing said next available page identifier by the size of said data object, wherein said size indicates a number of pages allocated to said data object.

2. The method of claim 1, wherein step (6) further comprises incrementing said next available page identifier by a rounding number of pages, thereby said next available page identifier records a page number equal to a starting page boundary of a data segment in the contiguous data space.

3. A database management system for simulating a database in a contiguous data space in computer memory, wherein the database comprises one or more data objects of variable size and is stored in one or more database storage disks, comprising:

creating means for creating the contiguous data space by allocating and initializing a data space to sub-data space mapping table having a plurality of table entries, wherein each table entry includes a sub-data space identifier, wherein the contiguous data space is a concatenation of a plurality of sub-data spaces, each sub-data space being assigned a sub-data space identifier, wherein the contiguous data space and said sub-data spaces are addressable by the database management system with said sub-data space identifiers and wherein the computer memory comprises a virtual memory and said sub-data spaces comprise virtual data spaces;

starting page means for allocating and initializing a starting page number identifier to record a starting page number in the contiguous data space for each data object in the database, wherein said starting page number indicates a page number at which a data object is placed in the contiguous data space;

next page means for allocating and initializing a next available page identifier to record a page number indicating a beginning of an empty page in the contiguous data space;

determining means for determining whether a data object has been added to the contiguous data space, when said data object is referenced;

setting means for setting said starting page number identifier for said data object equal to said next available page identifier if said determining means determines that said data object has not been added to the contiguous data space; and incrementing means for incrementing said next available page identifier by the size of said data object, wherein said size indicates a number of pages allocated to said data object.

4. The database management system according to claim 3, wherein said incrementing means further comprises second incrementing means for incrementing said next available page identifier by a rounding number of pages, thereby said next available page identifier records a page number equal to a starting page boundary of a data segment in the contiguous data space.

* * * * *